US011442493B2

United States Patent
Kim et al.

(10) Patent No.: US 11,442,493 B2
(45) Date of Patent: Sep. 13, 2022

(54) ELECTRONIC DEVICE FOR CONTROLLING CLOCK FREQUENCY AND OPERATING METHOD THEREFOR

(71) Applicant: Samsung Electronics Co., Ltd., Suwon-si (KR)

(72) Inventors: Hyunsoo Kim, Suwon-si (KR); Jungmin Park, Suwon-si (KR); Yongjun Park, Suwon-si (KR); Gunjong Bong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 16/770,561

(22) PCT Filed: Nov. 28, 2018

(86) PCT No.: PCT/KR2018/014805
§ 371 (c)(1),
(2) Date: Jun. 5, 2020

(87) PCT Pub. No.: WO2019/112230
PCT Pub. Date: Jun. 13, 2019

(65) Prior Publication Data
US 2021/0165441 A1    Jun. 3, 2021

(30) Foreign Application Priority Data
Dec. 6, 2017    (KR) .................. 10-2017-0166588

(51) Int. Cl.
*G06F 1/08*        (2006.01)
*H04W 52/02*    (2009.01)
*H04W 56/00*    (2009.01)

(52) U.S. Cl.
CPC .......... *G06F 1/08* (2013.01); *H04W 52/0287* (2013.01); *H04W 56/0035* (2013.01)

(58) Field of Classification Search
CPC .. G06F 1/08; H04W 52/0287; H04W 56/0035
(Continued)

(56) References Cited

U.S. PATENT DOCUMENTS 8,406,722 B2 *    3/2013    Roy .................... H04B 1/1027
                                                                    455/296
2007/0014556 A1    1/2007    Persson
(Continued)

FOREIGN PATENT DOCUMENTS

JP        2015-216522 A    12/2015
KR    10-2007-0106394 A    11/2007
(Continued)

OTHER PUBLICATIONS

International Search Report dated Feb. 22, 2019 in connection with International Patent Application No. PCT/KR2018/014805, 2 pages.
(Continued)

*Primary Examiner* — Tomi Skibinski

(57) ABSTRACT

Disclosed in various embodiments of the present invention are an electronic device for controlling a clock frequency and an operating method therefor. The electronic device comprises a communication module and a processor, wherein the processor can be configured to check, by using the communication module, a state of a downlink channel of a carrier to be transmitted, determine, on the basis of the channel state, a reference frequency band for a signal to be transmitted through the communication module, determine, as a first clock frequency, a clock frequency for at least one constituent element included in the electronic device if the reference frequency band is a first reference frequency band, and determine, as a second clock frequency, a clock frequency for at least one constituent element included in the
(Continued)

electronic device if the reference frequency band is a second reference frequency band. Other embodiments are also possible.

14 Claims, 7 Drawing Sheets

(58) Field of Classification Search
    USPC ........................................................ 327/291
    See application file for complete search history.

(56) References Cited

U.S. PATENT DOCUMENTS

| 2007/0253473 | A1 | 11/2007 | Ishii et al. |
| 2011/0293054 | A1 | 12/2011 | Skinner et al. |
| 2012/0042193 | A1 | 2/2012 | Gupta et al. |
| 2014/0334318 | A1 | 11/2014 | Pica et al. |

FOREIGN PATENT DOCUMENTS

| KR | 10-2008-0027840 A | 3/2008 |
| KR | 10-2016-0008580 A | 1/2016 |
| WO | 2010/096910 A1 | 9/2010 |

OTHER PUBLICATIONS

Written Opinion of the International Searching Authority dated Feb. 22, 2019 in connection with International Patent Application No. PCT/KR2018/014805, 6 pages.
Notice of Preliminary Rejection dated Aug. 20, 2021 in connection with Korean Patent Application No. 10-2017-0166588, 10 pages.
Korean Intellectual Property Office, "Notice of Patent Grant" dated Feb. 9, 2022, in connection with Korean Patent Application No. 10-2017-0166588, 4 pages.

\* cited by examiner

ELECTRONIC DEVICE FOR CONTROLLING CLOCK FREQUENCY AND OPERATING METHOD THEREFOR

CROSS-REFERENCE TO RELATED APPLICATIONS

This application is a 371 of International Application No. PCT/KR2018/014805 filed on Nov. 28, 2018, which claims priority to Korean Patent Application No. 10-2017-0166588 filed on Dec. 6, 2017, the disclosures of which are herein incorporated by reference in their entirety.

1. FIELD

Various embodiments of the disclosure relate to an electronic device for controlling a clock frequency of components of the electronic device and an operating method therefor.

2. DESCRIPTION OF RELATED ART

With the development of information and communication technology and semiconductor technology, various types of electronic devices are evolving into multimedia devices providing a diversity of multimedia services. For example, electronic devices may include various components, such as a camera and a display device (or display), in order to provide a variety of multimedia services.

An electronic device may determine an MIPI clock frequency for each component, based on an RF frequency band in order to prevent the MIPI clock frequency of each component from causing interference in a radio frequency (RF) band. For example, the electronic device may determine the MIPI clock frequency for each component, based on an absolute radio-frequency channel number (ARFCN) for the frequency band of a primary cell. However, when the electronic device supporting carrier aggregation determines the MIPI clock frequency in consideration of only the frequency band of the primary cell, the MIPI clock frequency may cause interference in the frequency band of a secondary cell. In the electronic device supporting carrier aggregation, the frequency band of the secondary cell may have more impact on downlink communication performance than the frequency band of the primary cell depending on the situation. Thus, when the MIPI clock frequency causes interference in the frequency band of the secondary cell, downlink data efficiency may be reduced.

Accordingly, various embodiments of the disclosure provide an electronic device and an operating method thereof for determining a clock frequency for components of the electronic device in consideration of downlink data efficiency in the electronic device.

SUMMARY

According to various embodiments, an electronic device may include: a communication module configured to perform communication using a plurality of component carriers; at least one processor; and a memory configured to be connected to the processor, wherein the memory may store instructions that, when executed, cause the processor to: determine a reference frequency band, based on downlink channel state information about each of the plurality of component carriers; and determine a clock frequency for at least one component included in the electronic device, based on the determined reference frequency band.

According to various embodiments, an operating method of an electronic device may include: identifying a plurality of component carriers used for communication with an external device; determining a reference frequency band, based on downlink channel state information about each of the plurality of component carriers; and determining a clock frequency for at least one component included in the electronic device, based on the determined reference frequency band.

An electronic device according to various embodiments of the disclosure may determine a clock frequency for components of the electronic device in view of downlink data efficiency, thereby selecting an optimal MIPI clock frequency according to a downlink channel state and accordingly improving downlink communication efficiency.

DETAILED DESCRIPTION

Figure 1:
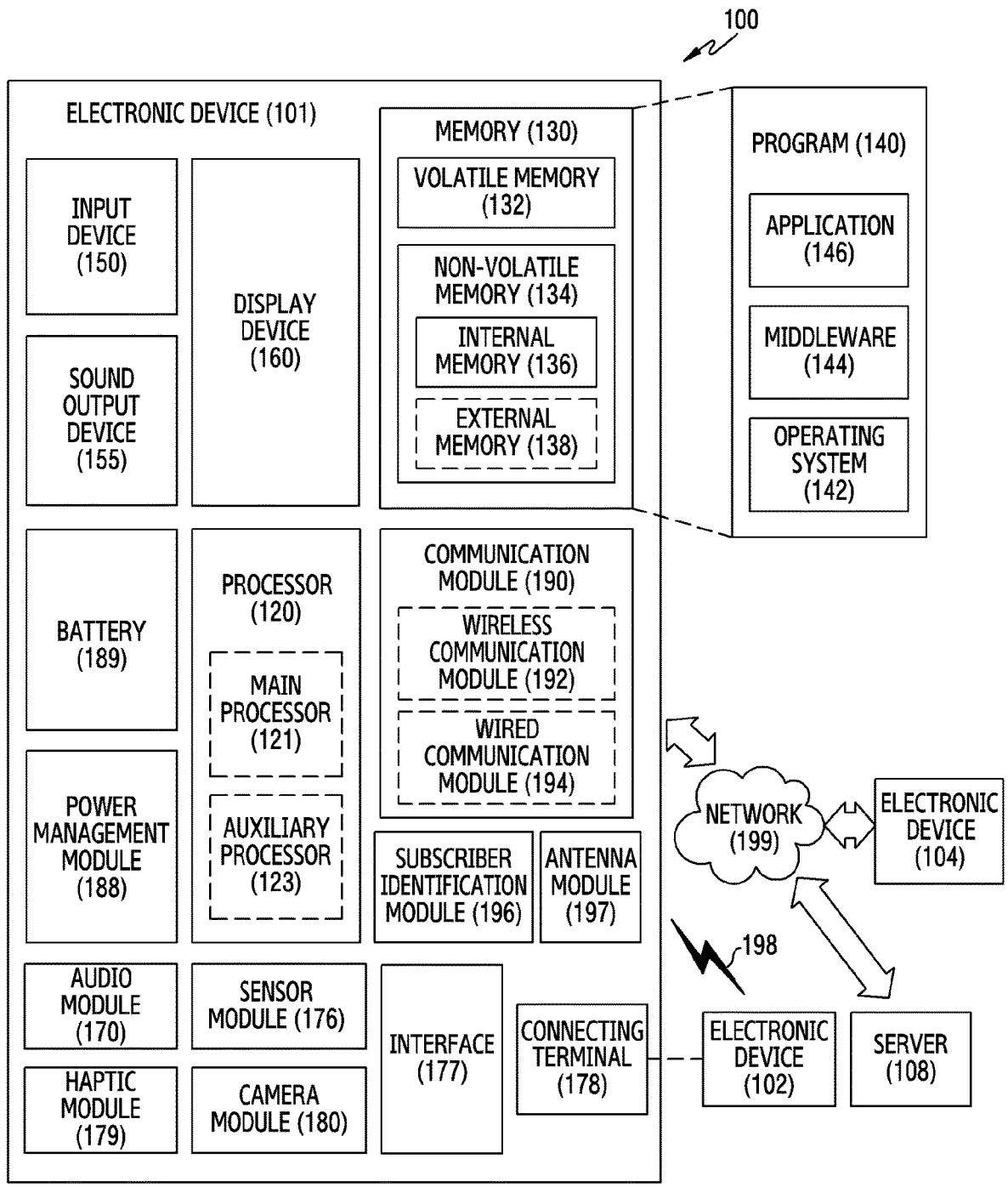
FIG. 1 is a block diagram illustrating an electronic device in a network environment according to various embodiments.

Hereinafter, various embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements. Singular expressions may include plural expressions unless the context clearly indicates otherwise.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
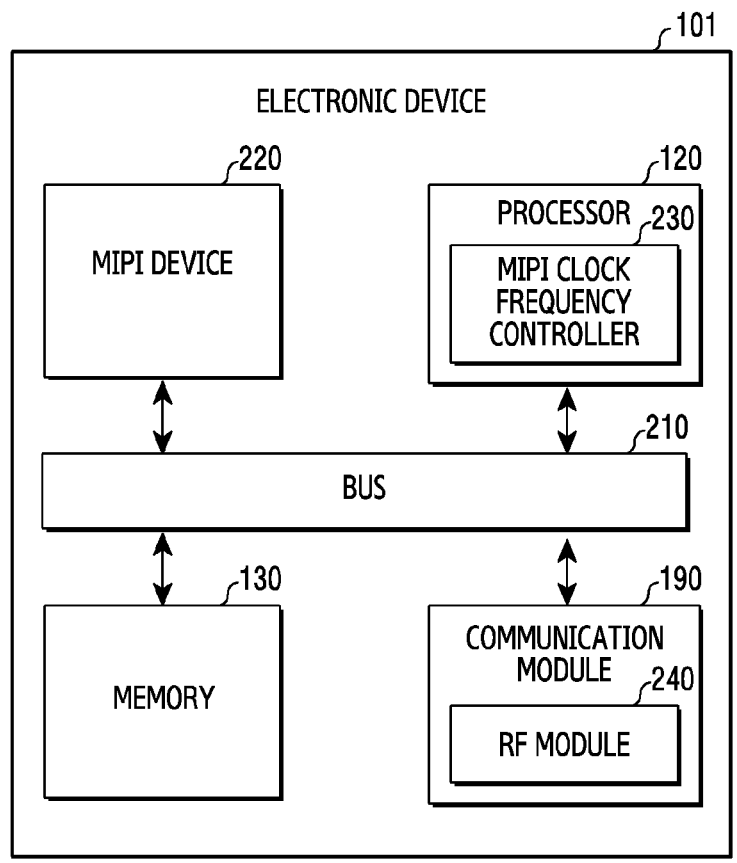
FIG. 2 is a block diagram illustrating an electronic device according to various embodiments.

FIG. 2 is a block diagram illustrating an electronic device 101 according to various embodiments. The electronic device 101 of FIG. 2 may be the electronic device 101 illustrated in FIG. 1.

Referring to FIG. 2, the electronic device 101 may include a bus 210, at least one mobile industry processor interface (MIPI) device 220, a processor 120, a memory 130, and a communication module 190.

According to various embodiments, the bus 110 may include, for example, a circuit to connect the components 220, 120, 130, and 190 to each other and to deliver communications (e.g., a control message and/or data) between the components According to various embodiments, the mobile industry processor interface (MIPI) device 220 may refer to a component to communicate with at least one other component (e.g., another MIPI device or the processor 120) using an MIPI. The MIPI device 220 may be, for example, a camera module (e.g., the camera module 180) or a display device (e.g., the display device 160). The illustrated MIPI devices 220 are examples to aid understanding of the disclosure, and the disclosure is not limited thereto. According to one embodiment, the MIPI device 220 may operate based on a clock frequency determined by the processor 120.

According to various embodiments, the processor 120 may include an MIPI clock frequency controller 230 to control a clock frequency for the at least one MIPI device 220. According to one embodiment, the processor 120 may detect at least one MIPI device driving event, and may determine a clock frequency for the at least one MIPI device 220 through the MIPI clock frequency controller 230 in response to detection of the driving event. The MIPI device driving event may include at least one of a power-on event or an activation event. The MIPI device driving event may occur by a user input or another event. For example, when the MIPI device 220 is a camera module, a driving event for the MIPI device 220 may occur by a user input to request driving of a camera. In another example, when the MIPI device 220 is a display device, a driving event for the MIPI device 220 may occur by a power-on event of the electronic device 101 or a user input to activate the electronic device 101 in a standby state. The illustrated driving events for the MIPI device 220 are examples of the disclosure, and the disclosure is not limited thereto. For example, a driving event for the MIPI device 220 may occur by various factors.

According to various embodiments, the processor 120 may determine a clock frequency of the MIPI device 220, based on at least one frequency band (or RF frequency band) used by the communication module 190 for communication with an external device (e.g., a base station or another electronic device). For example, the processor 120 may identify at least one frequency band being used by the communication module 190 for communication with an external device and may determine a reference frequency band, based on the identified frequency band. The processor 120 may identify an available clock frequency range of the MIPI device 220 from the memory 130 and may determine a clock frequency that does not cause interference with the reference frequency band within the identified clock frequency range as the clock frequency of the MIPI device 220.

According to various embodiments, the processor 120 may determine the reference frequency band, based on whether the communication module 190 operates in a carrier aggregation (CA or carrier combining) mode. For example, the processor 120 may determine the reference frequency band, based on whether the communication module 190 communicates with the external device using a plurality of component carriers or communicates with the external device using one component carrier. According to various embodiments, when the communication module 190 does not operate in the carrier aggregation mode, the processor 120 may determine a frequency band corresponding to one component carrier being used by the communication module 190 for communication with the external device as the reference frequency band. For example, the processor 120 may determine the frequency band of a primary component carrier (PCC) being used by the communication module 190 as the reference frequency band.

According to various embodiments, when the communication module 190 operates in the carrier aggregation mode, the processor 120 may determine the reference frequency band, based on the downlink channel state of the primary component carrier and/or at least one secondary component carrier. For example, the processor 120 may select at least one component carrier, based on whether downlink channel state information about each of the primary component carrier and/or the at least one secondary component carrier satisfies a preset condition, and may determine the frequency band of the selected component carrier as the reference frequency band. The downlink channel state information may include, for example, at least one of a reference signal received power (RSRP), a received signal strength indication (RSSI), a reference signal received quality (RSRQ) a signal-to-interference-plus-noise ratio (SINR), or a combination thereof. The processor 120 may set a frequency band having a downlink channel state being a middle electric field or lower as the reference frequency band, based on whether the downlink channel state information about each of the primary component carrier and/or the at least one secondary component carrier satisfies the preset condition. This is for determining a frequency not causing interference in a frequency band that is the middle electric field or lower as the clock frequency of the MIPI device 220, because deterioration in PF performance due to interference by the clock frequency of the MIPI device 220 occurs in a downlink channel state that is the middle electric field or lower. According to one embodiment, the processor 120 may compare the RSRP of each of the primary component carrier and/or the at least one secondary component carrier with a preset threshold RSPR, may select at least one component carrier, based on a comparison result, and may determine the frequency band of the selected component carrier as the reference frequency band. For example, when there is a component carrier having an RSRP lower than the threshold RSRP, the processor 120 may select at least one component carrier having an RSRP lower than the threshold RSRP, and may determine the frequency band of the selected at least one component as the reference frequency band. In another example, when there is not at least one component carrier having an RSRP lower than the threshold RSRP, the processor 120 may select the primary component carrier and may determine the frequency band of the primary component carrier as the reference frequency band. In still another example, when there is not at least one component carrier having an RSRP lower than the threshold RSRP, the processor 120 may select a component carrier having the lowest RSRP among the primary component carrier and/or the at least one secondary component carrier and may determine the frequency band of the selected component carrier as the reference frequency band. In yet another example, instead of comparing the RSRP of each of the primary component carrier and/or the at least one secondary component carrier with the preset threshold RSPR, the processor 120 may select a component carrier having the lowest RSRP among the primary component carrier and/or the at least one secondary component carrier and may determine the frequency band of the selected component carrier as the reference frequency band.

According to various embodiments, when there is a plurality of component carriers satisfying the preset condition, the processor 120 may select at least one component carrier, based on the bandwidth of each of the plurality of component carriers, and may determine the frequency band of the selected component carrier as the reference frequency band. For example, when there is a plurality of component carriers having an RSRP lower than the threshold RSRP, the processor 120 may select a component carrier having the largest bandwidth among the plurality of component carriers having the RSRP lower than the threshold RSRP and may determine the frequency band of the selected component carrier as the reference frequency band. For example, the processor 120 may compare the bandwidth of each of the plurality of component carriers having the RSRP lower than the threshold RSRP and may determine the frequency band of the component carrier having the largest bandwidth as the reference frequency band. According to one embodiment, when comparing the bandwidths of the plurality of component carriers, the processor 120 may consider whether multi-input multi-output (MIMO) is supported for each carrier component and/or a MIMO support mode. For example, when comparing the bandwidths of the plurality of component carriers, the processor 120 may apply a weighting, based on whether MIMO is supported and/or an MIMO support mode, so that the bandwidth of a component carrier supported by 4×4 MIMO has a weighting that is twice that of the bandwidth of a component carriers supported by 4×2 MIMO. For example, with the bandwidth of a first secondary component carrier being A and the bandwidth of a second secondary component carrier being B, when the first secondary component carrier is supported by 4×4 MIMO and the second secondary component carrier is supported by 4×2 MIMO, the processor 120 may apply a weighting to the bandwidth of the first secondary component carrier, thereby determining that the bandwidth of the first secondary component carrier is 2A and the bandwidth of the second secondary component carrier is B. The processor 120 may compare the bandwidths of the first secondary component carrier and the second secondary component carrier, which are respectively 2A and B, and may determine the frequency band of a component carrier having a larger bandwidth as the reference frequency band. In the above-described embodiments, the frequency band of the component carrier having the largest bandwidth is selected because data efficiency is more significantly reduced when interference by the clock frequency of the MIPI device 220 occurs in a frequency band having a relatively large bandwidth than when interference by the clock frequency of the MIPI device 220 occurs in a frequency band having a relatively narrow bandwidth. Therefore, the processor 120 may determine the frequency band of a component carrier having the largest bandwidth among a plurality of component carriers having a downlink channel state being the middle electric field or lower as the reference frequency band and may select a frequency not causing interference in the reference frequency band as the clock frequency of the MIPI device 220.

According to various embodiments, when a plurality of component carriers satisfying the preset condition has the same bandwidth, the processor 120 may select a component carrier having the worst downlink channel state among the plurality of component carriers and may determine the frequency band of the selected component carrier as the reference frequency band. For example, when a plurality of component carriers having an RSRP lower than the threshold RSRP has the same bandwidth, the processor 120 may measure an SINR for each of the plurality of component carriers and may determine the frequency band of a component carrier corresponding to the lowest SINR as the reference frequency band. Using an SINR is for illustration, and the disclosure is not limited thereto. For example, the processor 120 may select a component carrier having the worst downlink channel state using other downlink channel state information (e.g., RSRP, RSSI, or RSRQ) and may determine the frequency band of the selected component carrier as the reference frequency band.

According to various embodiments, when the at least one frequency band (or RF frequency band) used by the communication module 190 for communication with the external device is changed, the processor 120 may change the clock frequency of the MIPI device 220. For example, when the frequency band of the primary component carrier and/or the secondary component carrier is changed, the processor 120 may change the clock frequency of the MIPI device 220 in the manners described above.

According to various embodiments, the memory 130 may store information indicating a clock frequency range available for each of the at least one MIPI device 220. According to one embodiment, a different clock frequency range may be used by each MIPI device 220. For example, a clock frequency range available for the display device (e.g., the display device 160) and a clock frequency range available for the camera (e.g., the camera 180) may be different. The information indicating the clock frequency range available for each MIPI device 220 may be set and changed by a designer and/or operator.

According to various embodiments, the communication module 190 may include an RF module 240. The RF module 240 may transmit and receive an RF signal for communication with an external device (e.g., a base station or another electronic device). Although not shown, the RF module 240 may include, for example, a transceiver, a power amp module (PAM), a frequency filter, or a low noise amplifier (LNA). Further, the RF module 240 may further include a component to transmit and receive electromagnetic waves in a free space in wireless communication, for example, a conductor or a conducting wire. According to one embodiment, the RF module 240 may transmit and receive a signal for communication with an external device using a primary component carrier and/or at least one secondary component carrier according to control of the processor 120. According to one embodiment, the RF module 240 may transmit and receive a signal, based on whether MIMO is supported and/or a MIMO operation mode.

According to various embodiments, an electronic device (e.g., the electronic device 101 of FIG. 1 and/or the electronic device 101 of FIG. 2) may include: a communication module (e.g., the communication module 190 of FIG. 1 and/or the communication module 190 of FIG. 2) configured to perform communication using a plurality of component carriers; at least one processor (e.g., the processor 120 of FIG. 1 and/or the processor 120 of FIG. 2); and a memory (e.g., the memory 130 of FIG. 1 and/or the memory 130 of FIG. 2) configured to be connected to the processor (e.g., the processor 120), wherein the memory (e.g., the memory 130) may store instructions that, when executed, cause the processor (e.g., the processor 120), to: determine a reference frequency band, based on downlink channel state information about each of the plurality of component carriers; and determine a clock frequency for at least one component included in the electronic device, based on the determined reference frequency band.

According to various embodiments, the instructions may cause the processor (e.g., the processor 120) to: determine whether the downlink channel state information about each of the plurality of component carriers satisfies a preset condition; and determine a frequency band of at least one component carrier as the reference frequency band when downlink channel state information about the at least one component carrier among the plurality of component carriers satisfies the preset condition.

According to various embodiments, the instructions may cause the processor (e.g., the processor 120) to determine the reference frequency band, based on frequency bandwidths of two or more component carriers when downlink channel state information about the two or more component carriers among the plurality of component carriers satisfies the preset condition According to various embodiments, the instructions may cause the processor (e.g., the processor 120) to: compare frequency bandwidth sizes of the two or more component carriers; and determine a frequency band of a component carrier having the largest frequency bandwidth size as the reference frequency band.

According to various embodiments, the instructions may cause the processor (e.g., the processor 120) to: determine a weighting for each of the two or more component carriers, based on at least one of whether multi-input multi-output (MIMO) is supported for the two or more component carriers or a MIMO support mode; apply the determined weighting to a frequency bandwidth size of each of the two or more component carriers; and compare the bandwidth size to which the weighting is applied.

According to various embodiments, the instructions may cause the processor (e.g., the processor 120) to: select at least one component carrier, based on additional downlink channel state information about the two or more component carriers when the two or more component carriers have the same frequency bandwidth size; and determine a frequency band of the selected component carrier as the reference frequency band.

According to various embodiments, the downlink channel state information may be a reference signal received power, and the additional downlink channel state information may be a signal-to-interference-plus-noise ratio.

According to various embodiments, the instructions may cause the processor (e.g., the processor 120) to determine a frequency band of a primary component carrier among the plurality of component carriers as the reference frequency band when the downlink channel state information about each of the plurality of component carriers does not satisfy the preset condition.

According to various embodiments, the instructions may cause the processor (e.g., the processor 120) to: detect a change in the plurality of component carriers and re-determine the reference frequency band, based on the change; and change the clock frequency for the at least one component included in the electronic device, based on the re-determined reference frequency band, and the change may include at least one of a frequency band change of at least one component carrier among the plurality of component carriers, addition of a new component carrier, and deletion of at least one component carrier among the plurality of component carriers.

According to various embodiments, the downlink channel state information may include at least one of a reference signal received power, a received signal strength indication, a reference signal received quality, a signal-to-interference-plus-noise ratio, or a combination thereof.

According to various embodiments, an electronic device (e.g., the electronic device 101 of FIG. 1 and/or the electronic device 101 of FIG. 2) may include: a communication module (e.g., the communication module 190 of FIG. 1 and/or the communication module 190 of FIG. 2); and a processor (e.g., the processor 120 of FIG. 1 and/or the processor 120 of FIG. 2), wherein the processor (e.g., the processor 120) may be configured to: identify a downlink channel state of a carrier for transmission using the communication module (e.g., the communication module 190); determine a reference frequency band for a signal to be transmitted through the communication module, based on the channel state; determine a clock frequency for at least one component included in the electronic device as a first clock frequency when the reference frequency band is a first reference frequency band; and determine the clock frequency for the at least one component included in the electronic device as a second clock frequency when the reference frequency band is a second reference frequency band.

According to various embodiments, the processor (e.g., the processor 120) may be configured to: select at least one carrier, based on a downlink channel state of each of a plurality of carriers when there is the plurality of carriers for transmission using the communication module (e.g., the communication module 190); and determine the reference frequency band, based on a frequency band of the selected at least one carrier.

According to various embodiments, the processor (e.g., the processor 120) may be configured to determine the reference frequency band, based on a frequency bandwidth of each of a plurality of selected carriers when the plurality of carriers is selected based on the downlink channel state.

According to various embodiments, the processor (e.g., the processor 120) may be configured to: determine a weighting for each of a plurality of selected carriers, based on at least one of whether multi-input multi-output (MIMO) is supported for the plurality of selected carriers or a MIMO support mode when the plurality of carriers is selected based on the downlink channel state; apply the determined weighting to a frequency bandwidth size of each of the plurality of carriers; and determine the reference frequency band, based on the bandwidth size to which the weighting is applied.

According to various embodiments, the processor (e.g., the processor 120) may be configured to: detect a change in the carrier for transmission using the communication module (e.g., the communication module 190) and re-determine the reference frequency band, based on the change; and change the clock frequency for the at least one component included in the electronic device, based on the re-determined reference frequency band, and the change may include at least one of a frequency band change of at least one component carrier among a plurality of component carriers, addition of a new component carrier, and deletion of at least one component carrier among the plurality of component carriers.

According to various embodiments, the downlink channel state may include at least one of a reference signal received power, a received signal strength indication, a reference signal received quality, a signal-to-interference-plus-noise ratio, or a combination thereof.

According to various embodiments, the first clock frequency may be a frequency not causing interference in the first reference frequency band, and the second clock frequency may be a frequency not causing interference in the second reference frequency band.

Figure 3:
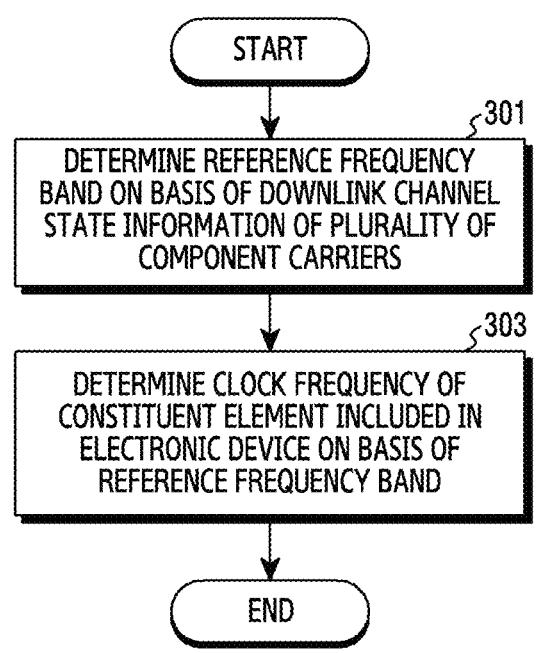
FIG. 3 is a flowchart showing that an electronic device determines a clock frequency according to various embodiments.

FIG. 3 is a flowchart showing that an electronic device determines a clock frequency according to various embodiments. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 and/or the electronic device 101 of FIG. 2.

According to various embodiments, in operation 301, the electronic device (e.g., the processor 120 or the MIPI clock frequency controller 230) may determine a reference frequency band, based on a downlink channel state of a plurality of component carriers. For example, a processor (e.g., the processor 120) of the electronic device may measure downlink channel state information about each of a primary component carrier and/or a secondary component carrier used for communication with an external device (e.g., a base station or another electronic device). The downlink channel state information may include, for example, at least one of a reference signal received power (RSRP), a received signal strength indication (RSSI), a reference signal received quality (RSRQ), a signal-to-interference-plus-noise ratio (SINR), or a combination thereof. The processor (e.g., the processor 120) of the electronic device may select at least one component carrier, based on the measured downlink channel state information and may determine a frequency band corresponding to the selected component carrier as the reference frequency band.

According to various embodiments, in operation 303, the electronic device (e.g., the processor 120 or the MIPI clock frequency controller 230) may determine a clock frequency of a component included in the electronic device, based on the reference frequency band. For example, the processor (e.g., the processor 120) of the electronic device may select a frequency not causing interference in the reference frequency band within a preset clock frequency range and may determine the selected frequency as the clock frequency of the component included in the electronic device. The component included in the electronic device may be an MIPI device (e.g., the MIPI device 220) that performs communication using an MIPI. For example, the component included in the electronic device may be a camera module (e.g., the camera module 180) or a display device (e.g., the display device 160). The preset clock frequency range may be different for each component. For example, the clock frequency range of the camera module and the clock frequency range of the display device may be different.

Figure 4:
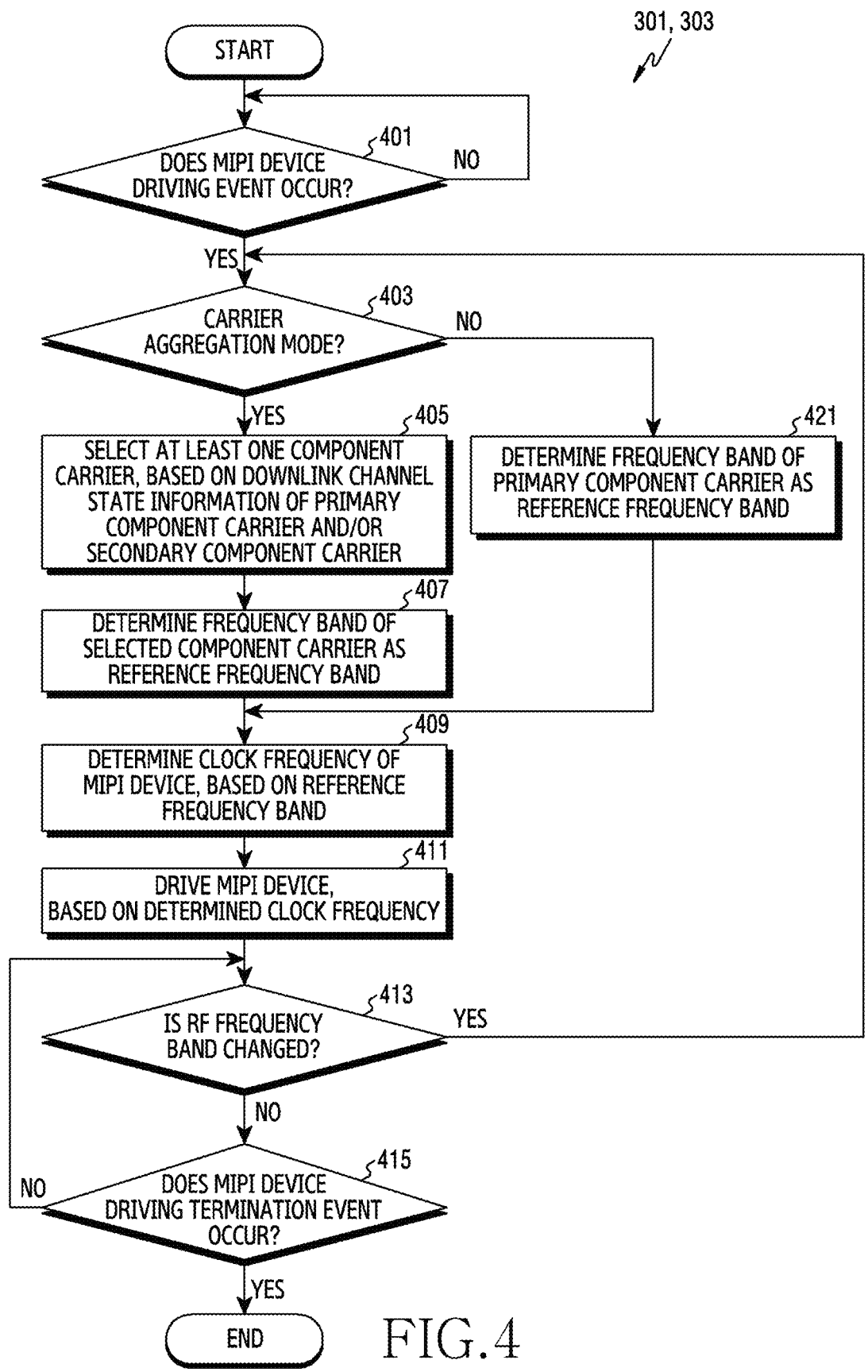
FIG. 4 is a flowchart showing that an electronic device determines a clock frequency, based on whether carrier aggregation is supported according to various embodiments.

FIG. 4 is a flowchart (301 and 303) showing that an electronic device determines a clock frequency, based on whether carrier aggregation is supported according to various embodiments. The following operations of FIG. 4 may be at least part of detailed operations of operation 301 and operation 303 of FIG. 3. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 and/or the electronic device 101 of FIG. 2.

According to various embodiments, in operation 401, the electronic device (e.g., the processor 120 or the MIPI clock frequency controller 230) may determine whether an MIPI device driving event occurs. For example, a processor (e.g., the processor 120) of the electronic device may determine whether a power-on event or an activation event for the MIPI device occurs. The MIPI device driving event may occur by a user input or occurrence of a different event (e.g., occurrence of a notification event).

According to various embodiments, in operation 403, the electronic device (e.g., the processor 120 or the MIPI clock frequency controller 230) may determine whether the electronic device is operating in the carrier aggregation mode. For example, the processor (e.g., processor 120) of the electronic device may determine whether the electronic device is operating in the carrier aggregation mode that uses a plurality of component carriers for communication with at least one external device (e.g., a base station, or another electronic device).

According to various embodiments, when not operating in the carrier aggregation mode, the electronic device (e.g., the processor 120 or the MIPI clock frequency controller 230) may determine the frequency band of a primary component carrier as a reference frequency band in operation 421. For example, since the electronic device not operating in the carrier aggregation mode communicates with an external device using only the primary component carrier, the processor (e.g., the processor 120) of the electronic device may determine a frequency band corresponding to the primary component carrier as the reference frequency band.

According to various embodiments, when operating in the carrier aggregation mode, the electronic device (e.g., the processor 120 or the MIPI clock frequency controller 230) may select at least one component carrier, based on the downlink channel state of the primary component carrier and/or at least one secondary component carrier in operation 405. According to one embodiment, the processor (e.g., the processor 120) of the electronic device may measure downlink channel state information about each of the primary component carrier and/or the at least one secondary component carrier and may determine whether the measured downlink channel state information satisfies a preset condition. The processor (e.g., the processor 120) of the electronic device may select at least one component carrier that satisfies the preset condition.

According to various embodiments, in operation 407, the electronic device (e.g., the processor 120 or the MIPI clock frequency controller 230) may determine the frequency band of the selected at least one component carrier as the reference frequency band. For example, when one component carrier is selected, the processor (e.g., the processor 120) of the electronic device may determine a frequency band corresponding to the selected one component carrier as a reference frequency band. In another example, when a plurality of component carriers is selected, the processor (e.g., the processor 120) of the electronic device may determine all frequency bands of the plurality of component carriers as reference frequency bands. In still another example, when a plurality of component carriers is selected, the processor (e.g., the processor 120) of the electronic device may reselect one of the plurality of component carriers and may determine a frequency band corresponding to the reselected one component carrier as a reference frequency band.

According to various embodiments, in operation 409, the electronic device (e.g., the processor 120 or the MIPI clock frequency controller 230) may determine the clock frequency of the MIPI device, based on the reference frequency band. For example, the processor (e.g., the processor 120) of the electronic device may identify a clock frequency range for the MIPI device (e.g., the MIPI device 220) for which the driving event occurs and may select a frequency not causing interference in the reference frequency band within the identified clock frequency range. The processor (e.g., the processor 120) of the electronic device may determine the selected frequency as the clock frequency of the MIPI device (e.g., the MIPI device 220).

According to various embodiments, in operation 411, the electronic device (e.g., the processor 120 or the MIPI clock frequency controller 230) may drive the MIPI device, based on the determined clock frequency. For example, when the clock frequency of a camera module (e.g., the camera module 160) is determined, the processor (e.g., the processor 120) of the electronic device may control the camera module to operate according to the determined clock frequency.

According to various embodiments, in operation 413, the electronic device (e.g., the processor 120 or the MIPI clock frequency controller 230) may determine whether an RF frequency band is changed. For example, the processor (e.g., the processor 120) of the electronic device may determine whether at least one of a frequency change event of at least one component carrier being used by an RF module (e.g., the RF module 240), a component carrier addition event, or a component carrier deletion event occurs. The frequency change event of the component carrier, the component carrier addition event, or the component carrier deletion event may occur by a change in environment of communication between the electronic device and the external device and/or an operation performed by the electronic device.

According to various embodiments, when the RF frequency band is changed, the electronic device (e.g., the processor 120 or the MIPI clock frequency controller 230) may return to operation 403 and may perform the following operations again. According to various embodiments, when the RF frequency band is not changed, the electronic device (e.g., the processor 120 or the MIPI clock frequency controller 230) may determine whether an MIPI device driving termination event occurs in operation 415. For example, the processor (e.g., the processor 120) of the electronic device may determine whether a power-off event or a deactivation event for the MIPI device occurs. The MIPI device driving termination event may occur by a user input or occurrence of a different event (e.g., a preset time-elapsing event). According to various embodiments, when the MIPI device driving termination event does not occur, the electronic device (e.g., the processor 120 or the MIPI clock frequency controller 230) may perform operation 413.

Figure 5:
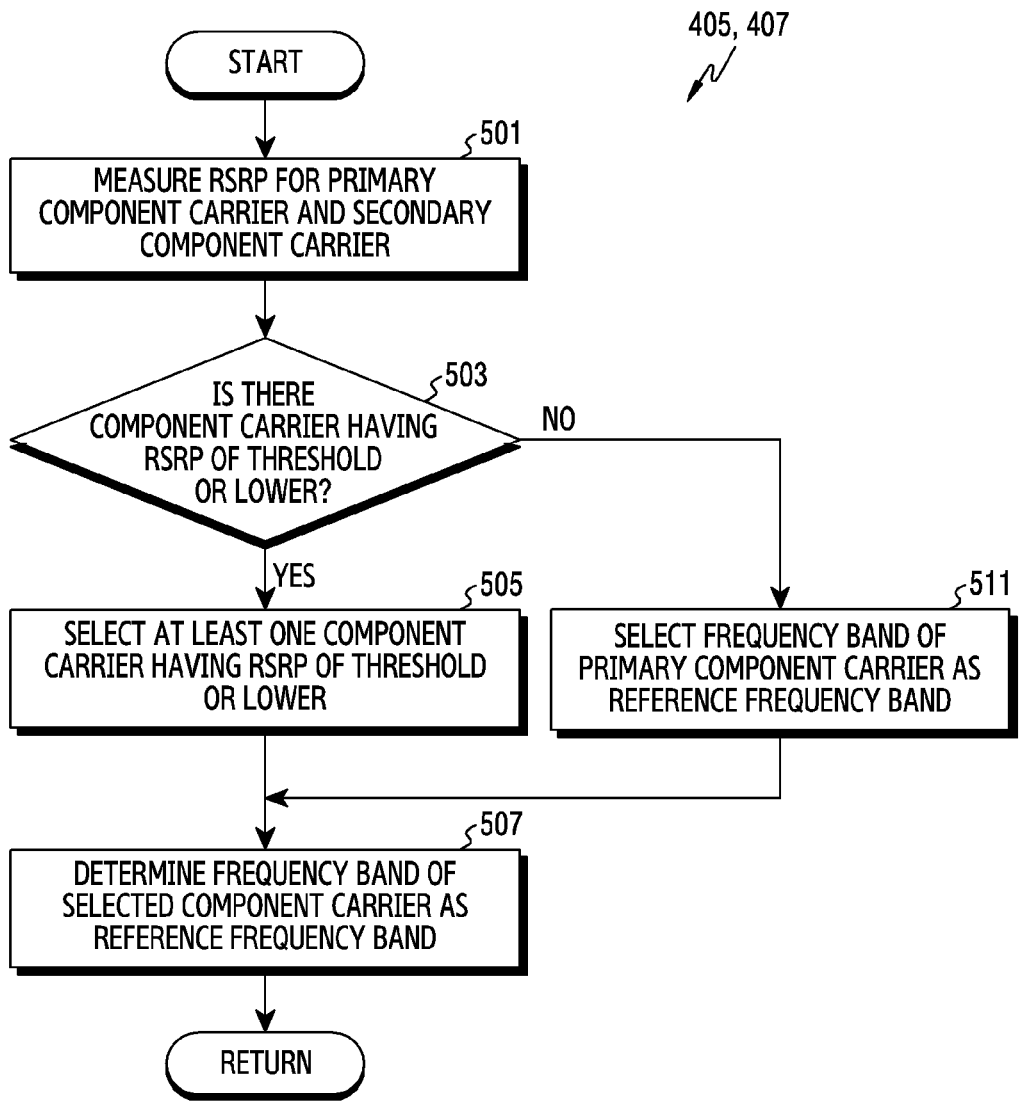
FIG. 5 is a flowchart showing that an electronic device determines a reference frequency band according to various embodiments.

FIG. 5 is a flowchart (405 and 407) showing that an electronic device determines a reference frequency band according to various embodiments. The following operations of FIG. 5 may be at least part of detailed operations of operation 405 and operation 407 of FIG. 4. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 and/or the electronic device 101 of FIG. 2.

According to various embodiments, in operation 501, the electronic device (e.g., the processor 120 or the MIPI clock frequency controller 230) may measure an RSRP for a primary component carrier and a secondary component carrier. For example, the processor (e.g., the processor 120) of the electronic device may measure an RSRP for each of the primary component carrier and at least one secondary component carrier through an RF module (e.g., the RF module 240).

According to various embodiments, in operation 503, the electronic device (e.g., the processor 120 or the MIPI clock frequency controller 230) may determine whether there is a component carrier having an RSRP of a threshold or lower. For example, the processor (e.g., the processor 120) of the electronic device may compare the RSRP measured for each of the primary component carrier and the secondary component carrier with a preset threshold and may determine whether there is a component carrier having an RSRP of the threshold or lower.

According to various embodiments, when there is a component carrier having an RSRP of the threshold or lower, the electronic device (e.g., the processor 120 or the MIPI clock frequency controller 230) may select at least one component carrier having an RSRP of the threshold or lower in operation 505. According to one embodiment, when there is one component carrier having an RSRP of the threshold or lower, the processor (e.g., the processor 120) of the electronic device may select the one component carrier. According to an embodiment, when there is a plurality of component carriers having an RSRP of the threshold or lower, the processor (e.g., processor 120) of the electronic device may select all of the plurality of component carriers. According to one embodiment, when there is a plurality of component carriers having an RSRP of the threshold or lower, the processor (e.g., the processor 120) of the electronic device may select at least one component carrier among the plurality of component carriers, based on a bandwidth and/or an SINR as illustrated below in FIG. 6.

According to various embodiments, when there is no component carrier having an RSRP of the threshold or lower, the electronic device (e.g., the processor 120 or the MIPI clock frequency controller 230) may select the frequency band of the primary component carrier as a reference frequency band in operation 511.

According to various embodiments, in operation 507, the electronic device (e.g., the processor 120 or the MIPI clock frequency controller 230) may determine the frequency band of the selected component carrier as a reference frequency band. For example, the processor (e.g., the processor 120) of the electronic device may determine the frequency band of the selected component carrier as a reference frequency band for selecting the clock frequency of an MIPI device (e.g., the MIPI device 220).

Although FIG. 5 illustrates an RSRP as an example of downlink channel state information about a component carrier, the electronic device (e.g., the processor 120 or the MIPI clock frequency controller 230) may use different type of downlink channel state information according to various embodiments. For example, the electronic device (e.g., the processor 120 or the MIPI clock frequency controller 230) may determine a reference frequency band using at least one of an RSSI, an RSRQ, or an SINR.

Further, although FIG. 5 shows that the frequency band of the primary component carrier is selected as a reference frequency band when there is no component carrier having an RSRP of the threshold or lower, the electronic device (e.g., the processor 120 or the MIPI clock frequency controller 230) may select the frequency band of a component carrier corresponding to the lowest RSRP among the primary component carrier and the secondary component carrier as a reference frequency band according to various embodiments.

In FIG. 5, the frequency band of a component carrier having an RSRP of the threshold or lower is determined as a reference frequency band, which is for determining a frequency not causing interference in a frequency band that is a middle electric field or lower as the clock frequency of the MIPI device 220, because deterioration in PF performance due to interference by the clock frequency of the MIPI device (e.g., the MIPI device 220) occurs in a downlink channel state that is the middle electric field or lower.

Figure 6:
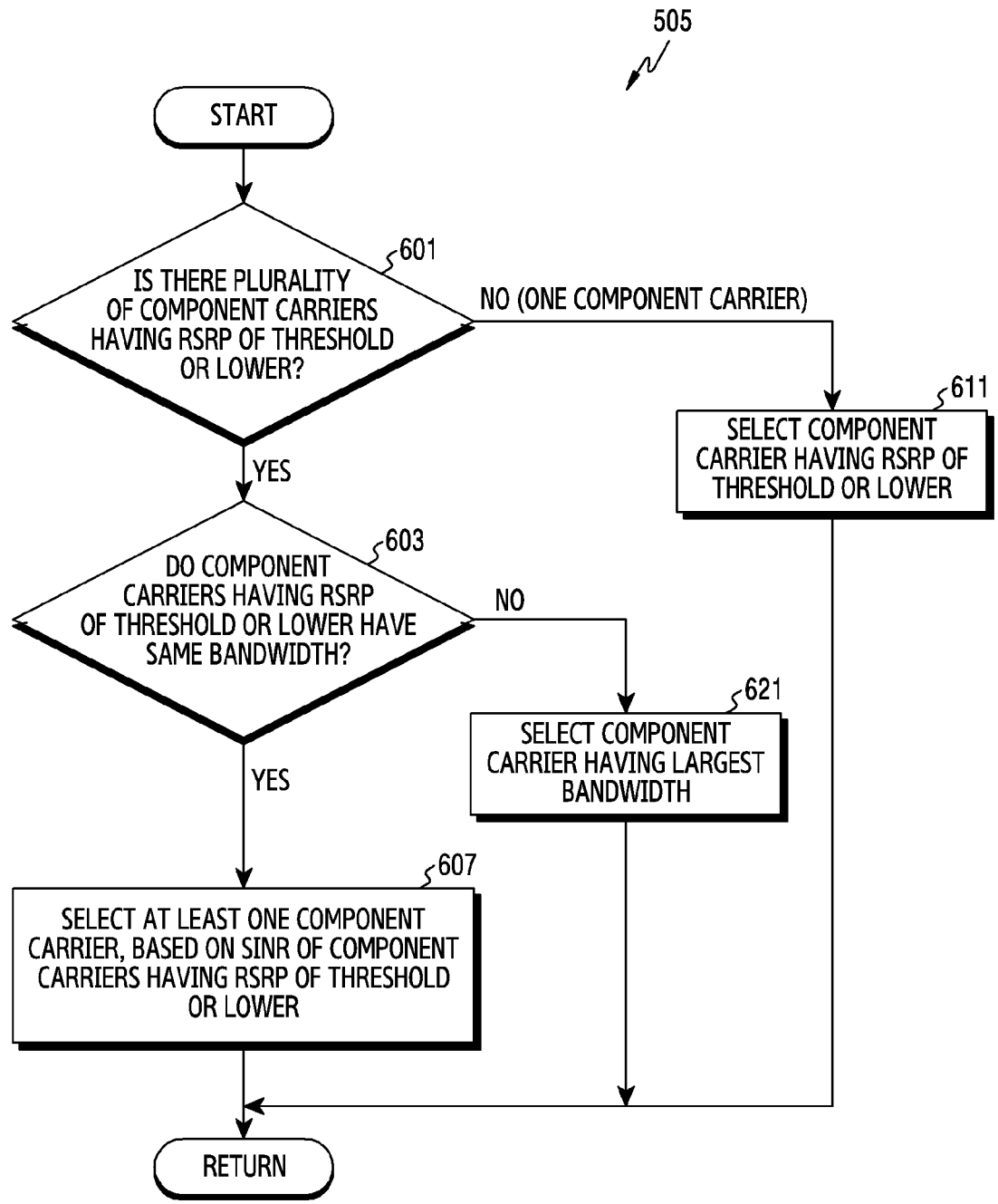
FIG. 6 is a flowchart showing that an electronic device selects at least one component carrier based on a downlink channel state according to various embodiments.

FIG. 6 is a flowchart showing that an electronic device selects at least one component carrier based on a downlink channel state according to various embodiments. The following operations of FIG. 6 may be at least part of detailed operations of operation 505 of FIG. 5. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 and/or the electronic device 101 of FIG. 2.

According to various embodiments, in operation 601, the electronic device (e.g., the processor 120 or the MIPI clock frequency controller 230) may determine whether there is a plurality of component carriers having an RSRP of a threshold or lower or there is one component carrier having an RSRP of the threshold or lower. For example, the processor (e.g., the processor 120) of the electronic device may compare the RSRP of the primary component carrier and the RSRP of the secondary component carrier with the threshold in operation 503, thereby determining whether there is a plurality of component carriers having an RSRP lower than the threshold or there is one component carrier having an RSRP lower than the threshold.

According to various embodiments, when there is one component carrier having an RSRP of the threshold or lower, the electronic device (e.g., the processor 120 or the MIPI clock frequency controller 230) may select the one component carrier having the RSRP of the threshold or lower in operation 611.

According to various embodiments, when there is a plurality of component carriers having an RSRP of the threshold or lower, the electronic device (e.g., the processor 120 or the MIPI clock frequency controller 230) may determine whether the component carriers having the RSRP of the threshold or lower have the same bandwidth in operation 603. For example, the processor (e.g., the processor 120) of the electronic device may compare the bandwidth of each of the plurality of component carriers having the RSRP of the threshold or lower. Here, the processor (e.g., the processor 120) of the electronic device may set a weighting for the bandwidth, based on whether MIMO is supported for each carrier component and/or an MIMO support mode. For example, when comparing the bandwidths of the plurality of component carriers, the processor (e.g., the processor 120) of the electronic device may set a weighting for the bandwidth of at least one component carrier, based on whether MIMO is supported and/or an MIMO support mode, so that the bandwidth of a component carrier supported by 4×4 MIMO has a weighting that is twice that of the bandwidth of a component carriers supported by 4×2 MIMO. For example, with the bandwidth of a first secondary component carrier being A and the bandwidth of a second secondary component carrier being B, when the first secondary component carrier is supported by 4×4 MIMO and the second secondary component carrier is supported by 4×2 MIMO, the processor (e.g., the processor 120) of the electronic device may apply a weighting to the bandwidth of the first secondary component carrier, thereby determining that the bandwidth of the first secondary component carrier is 2A and the bandwidth of the second secondary component carrier is B. The processor (e.g., the processor 120) of the electronic device may determine whether 2A, which is the bandwidth to which the weighting is applied, is the same as B.

According to various embodiments, when the bandwidths of the component carriers having the RSRP of the threshold or lower are different, the electronic device (e.g., the processor 120 or the MIPI clock frequency controller 230) may select a component carrier having the largest bandwidth in operation 621. The frequency band of the component carrier having the largest bandwidth is selected because a decrease in data efficiency where interference by the clock frequency of an MIPI device (e.g., the MIPI device 220) occurs in a frequency band having a relatively large bandwidth is greater than a decrease in data efficiency where interference by the clock frequency of the MIPI device 220 occurs in a frequency band having a relatively narrow. Therefore, the processor (e.g., the processor 120) of the electronic device may select a component carrier having the largest bandwidth among a plurality of component carriers having a downlink channel state that is a middle electric field or lower, thereby selecting a frequency not causing interference in the frequency band of the selected component carrier as the clock frequency of the MIPI device (e.g., the MIPI device 220).

According to various embodiments, when the bandwidths of the component carriers having the RSRP of the threshold or lower are the same, the electronic device (e.g., the processor 120 or the MIPI clock frequency controller 230) may select at least one component carrier, based on the SINR of the component carriers having the RSRP of the threshold or lower in operation 607. For example, the processor (e.g., the processor 120) of the electronic device may measure an SINR for each of the component carriers having the RSRP of the threshold or lower and may select a component carrier corresponding to the lowest SINR. For example, the electronic device may select a component carrier having the worst downlink channel state.

Figure 7:
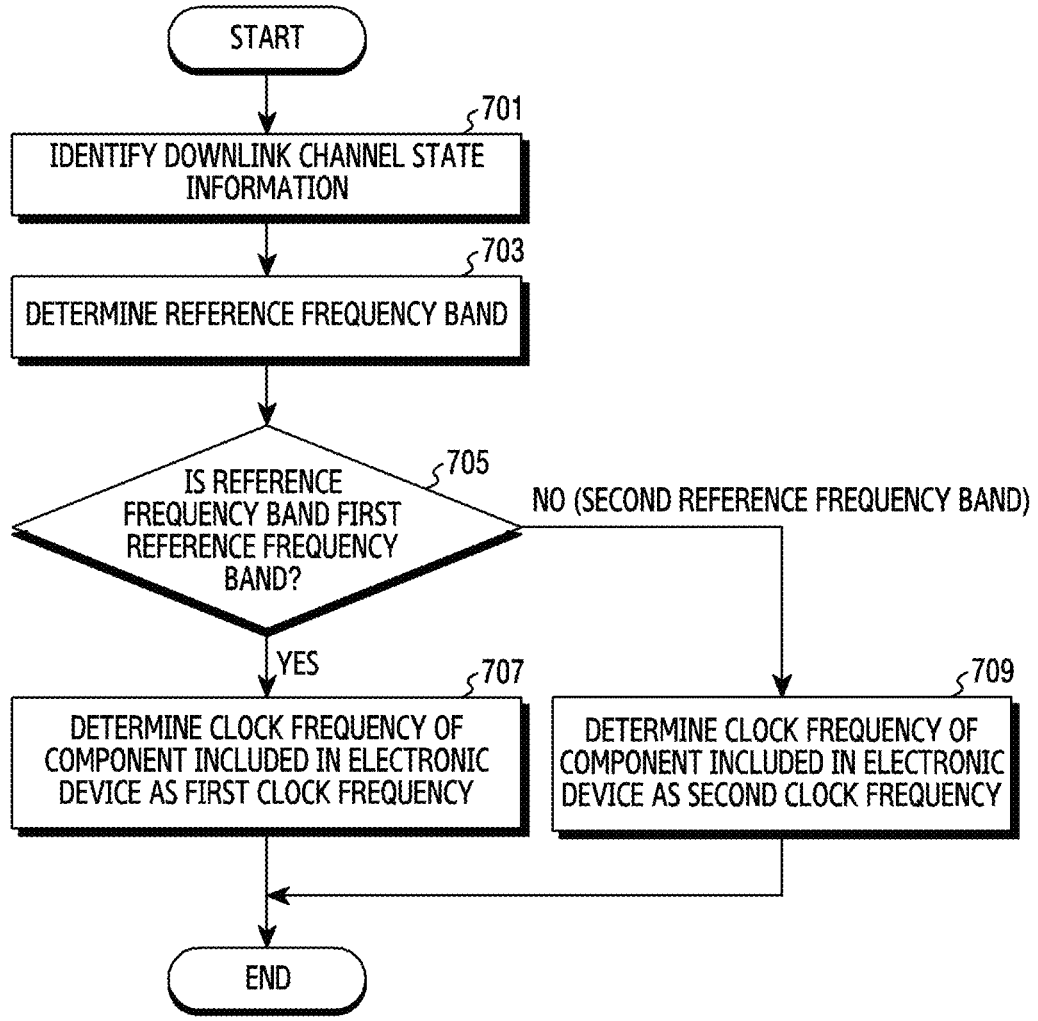
FIG. 7 is a flowchart showing that an electronic device determines a clock frequency based on a downlink channel state according to various embodiments.

FIG. 7 is a flowchart showing that an electronic device determines a clock frequency based on a downlink channel state according to various embodiments. In the following embodiments, individual operations may be performed sequentially but are not necessarily performed sequentially. For example, the order of individual operations may be changed, and at least two operations may be performed in parallel. Here, the electronic device may be the electronic device 101 of FIG. 1 and/or the electronic device 101 of FIG. 2.

According to various embodiments, in operation 701, the electronic device (e.g., the processor 120 or the MIPI clock frequency controller 230) may identify the downlink channel state of a carrier for transmission using a communication module (e.g., the communication module 190). For example, a processor (e.g., the processor 120) of the electronic device may obtain downlink channel state information about each of a primary component carrier and/or at least one secondary component carrier used for communication with an external device. The downlink channel state information may include, for example, at least one of an RSRP, an RSSI, an RSRQ, an SINR, or a combination thereof.

According to various embodiments, in operation 703, the electronic device (e.g., the processor 120 or the MIPI clock frequency controller 230) may determine a reference frequency band for a signal to be transmitted through the communication module (e.g., the communication module 190), based on the identified downlink channel state. The reference frequency band may be determined, for example, by a method described in operation 405 and operation 407 of FIG. 4.

According to various embodiments, in operation 705, the electronic device (e.g., the processor 120 or the MIPI clock frequency controller 230) may determine whether the reference frequency band is a first reference frequency band. For example, the processor (e.g., the processor 120) of the electronic device may determine whether the reference frequency band determined based on the downlink channel state corresponds to the first reference frequency band or a second reference frequency band.

According to various embodiments, when the reference frequency band is the first reference frequency band, the electronic device (e.g., the processor 120 or the MIPI clock frequency controller 230) may determine a clock frequency for at least one component included in the electronic device as a first clock frequency in operation 707. For example, the processor (e.g., the processor 120) of the electronic device may determine the first clock frequency not causing interference in the first reference frequency band as the clock frequency for the at least one component included in the electronic device.

According to various embodiments, when the reference frequency band is the second reference frequency band, the electronic device (e.g., the processor 120 or the MIPI clock frequency controller 230) may determine a clock frequency for at least one component included in the electronic device as a second clock frequency in operation 709. For example, the processor (e.g., the processor 120) of the electronic device may determine the second clock frequency not causing interference in the second reference frequency band as the clock frequency for the at least one component included in the electronic device.

According to various embodiments, an operating method of an electronic device (e.g., the electronic device 101 of FIG. 1 and/or the electronic device 101 of FIG. 2) may include: identifying a plurality of component carriers used for communication with an external device; determining a reference frequency band, based on downlink channel state information about each of the plurality of component carriers; and determining a clock frequency for at least one component included in the electronic device, based on the determined reference frequency band.

According to various embodiments, the determining of the reference frequency band may include: determining whether the downlink channel state information about each of the plurality of component carriers satisfies a preset condition; and determining a frequency band of at least one component carrier as the reference frequency band when downlink channel state information about the at least one component carrier among the plurality of component carriers satisfies the preset condition.

According to various embodiments, an operating method may further include determining the reference frequency band, based on frequency bandwidths of two or more component carriers when downlink channel state information about the two or more component carriers among the plurality of component carriers satisfies the preset condition.

According to various embodiments, the determining of the reference frequency band, based on the frequency bandwidths of the two or more component carriers may include: comparing frequency bandwidth sizes of the two or more component carriers; and determining a frequency band of a component carrier having the largest frequency bandwidth size as the reference frequency.

According to various embodiments, the comparing of the frequency bandwidth sizes of the two or more component carriers may include: determining a weighting for each of the two or more component carriers, based on at least one of whether multi-input multi-output (MIMO) is supported for the two or more component carriers or a MIMO support mode; applying the determined weighting to a frequency bandwidth size of each of the two or more component carriers; and comparing the bandwidth size to which the weighting is applied.

According to various embodiments, the operating method may further include: selecting at least one component carrier, based on additional downlink channel state information about the two or more component carriers when the two or more component carriers have the same frequency bandwidth size; and determining a frequency band of the selected component carrier as the reference frequency band.

According to various embodiments, the downlink channel state information may be a reference signal received power, and the additional downlink channel state information may be a signal-to-interference-plus-noise ratio.

According to various embodiments, the operating method may further include determining a frequency band of a primary component carrier among the plurality of component carriers as the reference frequency band when the downlink channel state information about each of the plurality of component carriers does not satisfy the preset condition.

According to various embodiments, the operating method may further include: detecting a change in the plurality of component carriers and re-determining the reference frequency band, based on the change; and changing the clock frequency for the at least one component included in the electronic device, based on the re-determined reference frequency band, and the change may include at least one of a frequency band change of at least one component carrier among the plurality of component carriers, addition of a new component carrier, and deletion of at least one component carrier among the plurality of component carriers.

According to various embodiments, the downlink channel state information may include at least one of a reference signal received power, a received signal strength indication, a reference signal received quality, a signal-to-interference-plus-noise ratio, or a combination thereof.

The electronic device according to various embodiments may be one of various types of electronic devices. The electronic devices may include, for example, a portable communication device (e.g., a smart phone), a computer device, a notebook, a PDA, a portable multimedia device, a portable medical device. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication module; and
a processor,
wherein the processor is configured to:
   determine whether the electronic device is operating in a carrier aggregation mode,
   when the electronic device is operating in the carrier aggregation mode, identify a downlink channel state of a primary component carrier and a second component carrier, for transmission using the communication module,
   select at least one component carrier, based on the downlink channel state,
   determine a clock frequency for at least one component comprised in the electronic device as a first clock frequency when a reference frequency band is a first reference frequency band, and
   determine the clock frequency for the at least one component comprised in the electronic device as a second clock frequency when the reference frequency band is a second reference frequency band.

2. The electronic device as claimed in claim 1, wherein the processor is configured to determine the reference frequency band, based on a frequency bandwidth of each of a plurality of selected carriers when the plurality of carriers is selected based on the downlink channel state.

3. The electronic device as claimed in claim 1, wherein the processor is configured to:
   determine a weighting for each of a plurality of selected carriers, based on at least one of whether multi-input multi-output (MIMO) is supported for the plurality of selected carriers or a MIMO support mode when the plurality of carriers is selected based on the downlink channel state,
   apply the determined weighting to a frequency bandwidth size of each of the plurality of carriers, and
   determine the reference frequency band, based on the bandwidth size to which the weighting is applied.

4. The electronic device as claimed in claim 1, wherein the processor is configured to:
   detect a change in a carrier for transmission using the communication module and re-determine the reference frequency band, based on the change, and
   change the clock frequency for the at least one component comprised in the electronic device, based on the re-determined reference frequency band,
   wherein the change comprises at least one of a frequency band change of at least one component carrier among a plurality of component carriers including the primary component carrier and a secondary component carrier, addition of a new component carrier, and deletion of at least one component carrier among the plurality of component carriers.

5. The electronic device as claimed in claim 1, wherein the downlink channel state comprises at least one of a reference signal received power, a received signal strength indication, a reference signal received quality, a signal-to-interference-plus-noise ratio, or a combination thereof,
   wherein the first clock frequency is a frequency not causing interference in the first reference frequency band, and
   wherein the second clock frequency is a frequency not causing interference in the second reference frequency band.

6. An electronic device comprising:
a communication module configured to perform communication in a carrier aggregation mode using a plurality of component carriers;
at least one processor; and
a memory configured to be connected to the processor, wherein the memory stores instructions that, when executed, cause the processor to:
   select at least one component carrier, based on downlink channel state information about each of a primary component carrier and a second component carrier among the plurality of component carriers,
   determine a frequency band of the selected at least one component carrier as a reference frequency band, and
   determine a clock frequency for at least one component comprised in the electronic device, based on the determined reference frequency band.

7. The electronic device as claimed in claim 6, wherein the instructions cause the processor to:
   determine whether the downlink channel state information about each of the plurality of component carriers satisfies a preset condition, and
   determine a frequency band of at least one component carrier as the reference frequency band when downlink channel state information about the at least one component carrier among the plurality of component carriers satisfies the preset condition.

8. The electronic device as claimed in claim 7, wherein the instructions cause the processor to determine the reference frequency band, based on frequency bandwidths of two or more component carriers when downlink channel state information about the two or more component carriers among the plurality of component carriers satisfies the preset condition, and
   wherein the reference frequency band is determined to be a frequency band of a component carrier having a largest frequency bandwidth size among the two or more component carriers.

9. The electronic device as claimed in claim 8, wherein the instructions cause the processor to:
   determine a weighting for each of the two or more component carriers, based on at least one of whether multi-input multi-output (MIMO) is supported for the two or more component carriers or a MIMO support mode,
   apply the determined weighting to a frequency bandwidth size of each of the two or more component carriers, and compare the bandwidth size to which the weighting is applied.

10. The electronic device as claimed in claim 8, wherein the instructions cause the processor to:
select at least one component carrier, based on additional downlink channel state information about the two or more component carriers when the two or more component carriers have the same frequency bandwidth size, and
determine a frequency band of the selected component carrier as the reference frequency band,
wherein the downlink channel state information is a reference signal received power, and
wherein the additional downlink channel state information is a signal-to-interference-plus-noise ratio.

11. The electronic device as claimed in claim 7, wherein the instructions cause the processor to determine a frequency band of a primary component carrier among the plurality of component carriers as the reference frequency band when the downlink channel state information about each of the plurality of component carriers does not satisfy the preset condition.

12. The electronic device as claimed in claim 6, wherein the instructions cause the processor to:
detect a change in the plurality of component carriers and re-determine the reference frequency band, based on the change, and
change the clock frequency for the at least one component comprised in the electronic device, based on the re-determined reference frequency band,
wherein the change comprises at least one of a frequency band change of at least one component carrier among the plurality of component carriers, addition of a new component carrier, and deletion of at least one component carrier among the plurality of component carriers.

13. The electronic device as claimed in claim 6, wherein the downlink channel state information comprises at least one of a reference signal received power, a received signal strength indication, a reference signal received quality, a signal-to-interference-plus-noise ratio, or a combination thereof.

14. An operating method of an electronic device, the method comprising:
identifying a plurality of component carriers used for communication in a carrier aggregation mode with an external device;
selecting at least one component carrier, based on downlink channel state information about each of a primary component carrier and a secondary component carrier among the plurality of component carriers;
determining a frequency band of the selected at least one component carrier as a reference frequency band; and
determining a clock frequency for at least one component comprised in the electronic device, based on the determined reference frequency band.

* * * * *